April 10, 1962 D. C. MARSH 3,029,081
SEAL
Filed May 17, 1957
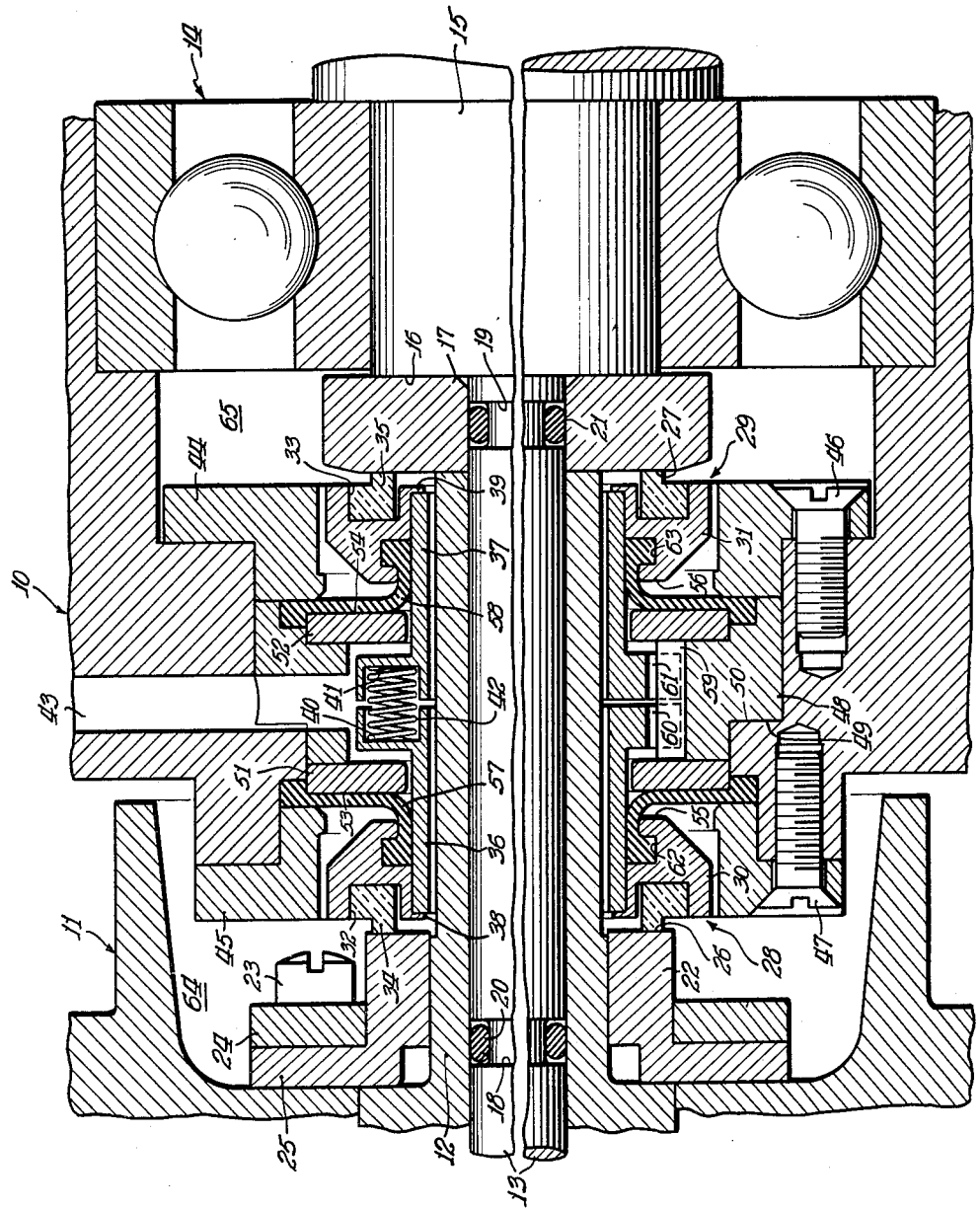
Inventor:
David C. Marsh
By: Frank C. Parker
Atty.

United States Patent Office 3,029,081
Patented Apr. 10, 1962

3,029,081
SEAL
David C. Marsh, Maple Heights, Ohio, assignor to Borg-Warner Corporation, Chicago, Ill., a corporation of Illinois
Filed May 17, 1957, Ser. No. 659,881
3 Claims. (Cl. 277—59)

The present invention relates generally to sealing devices and finds particular utility as a sealing device adapted for use in a fuel pump housing for isolating the fuel and the oil lubricant from each other and from the conventional seal drain.

The principal object of the present invention is to provide an improved sealing device of the foregoing general type and comprising pairs of optical flat type seals which respectively isolate the fuel and the lubricating oil from the seal drain.

More particularly, it is a principal object of the present invention to provide a sealing device adapted to be operatively disposed between a housing and a rotatable device disposed within the housing and including means for automatically compensating for variations in the dimensions between sealing surfaces on the rotatable device and the housing itself.

In connection with the immediately foregoing object of the present invention, the improved seal disclosed herein includes a pair of movable sealing devices cooperable with complementary sealing faces formed on a rotatable member and which sealing devices are normally biased by a resilient force which remains substantially constant irrespective of variations in the disposition of the sealing faces on the rotatable device and the housing within which the rotatable device is disposed.

Still more particularly, the present invention contemplates the provision of means on the housing and on the movable sealing devices respectively forming radially overlapping and axially spaced shoulder means between which resilient diaphragm means are respectively disposed for sealingly interconnecting the housing and the sealing devices and which permit displacement of the sealing devices axially and angularly within reasonable limits in order to accommodate variations in parallelism between the sealing surfaces.

Further, it is an object of the present invention to provide convenient means for affording an axially slidable connection between the sealing devices and the housing and which connection also facilitates slight relative rotation of the sealing devices within the housing.

In view of the overall simplicity and ease of manufacture of the present sealing mechanism, the foregoing objects, as well as numerous others, and numerous advantages will become apparent from the following detailed description, when read in conjunction with the appended drawing which shows the structural features of the sealing device comprising the subject matter of the present invention.

The FIGURE of the drawing shows a cross-sectional view of the sealing device.

With reference now to the drawing, it will be understood that the present sealing device is particularly adapted to be disposed within the housing and within which is also mounted a fuel pump. It is understood that the sealing mechanism disclosed herein is particularly designed for isolating pump fuel disposed in one portion of the housing and lubricating fluid or oil disposed in another portion of the housing from each other, as well as minimizing the loss of either the fuel or the lubricating fluid through the conventional seal drain provided for the sealing mechanism.

The present invention comprises a housing designated generally by reference numeral 10 within which a fuel pump is disposed and which fuel pump is represented fragmentarily by reference numeral 11. The fuel pump comprises a sleeve member 12 mounted concentrically around a driving shaft 13, the latter being rotatably mounted within the housing 10 by means of suitable bearing assemblies 14. The shaft 13 is formed with an enlarged bearing portion 15 having a radially outwardly extending shoulder 16 thereon and a suitable annular sealing member 17 is disposed in abutment with the shoulder 16. The shaft 13 is formed with a pair of axially spaced peripheral grooves 18 and 19 within which a pair of O-ring type seals 20 and 21 are respectively disposed and these two O-ring seals provide a substantially fluid-tight seal between the annular sealing member 17 and the shaft 13, and between sleeve shaft 12 and drive shaft 13.

The fuel pump 11 is driven by the drive shaft 13 through a driving connection (not shown) between the drive shaft 13 and the sleeve shaft 12 and the fuel pump 11 includes a suitable annular sealing ring or member 22 which is fixed to the fuel pump 11 by means of a plurality of threaded bolts 23 which extend through an annular washer-like member 24, through a radially extending flange 25 formed on the sealing member 22 and into the main body portion of the fuel pump 11.

The annular sealing member 22 is formed with a radially outwardly extending and substantially planar surface 26 which is ground substantially to optical smoothness and the sealing member 17 is provided with a similar radially outwardly extending planar surface 27 which is likewise ground substantially to optical smoothness. The two surfaces 26 and 27 together comprise sealing surfaces cooperable with complementary elements of a pair of relatively rotatably fixed sealing devices 28 and 29. The two surfaces 26 and 27 are rather accurately formed and are maintained in substantial parallelism and, further, are disposed at a substantially fixed distance apart even though the shaft assembly 12 and 13 may be shifted somewhat axially or angularly relative to the housing 10 due to manufacturing or operating tolerances.

The two sealing devices 28 and 29 respectively constitute a pair of axially movable annular sealing devices including annular members 30 and 31. The annular members 30 and 31 are respectively formed with axially opening peripheral grooves 32 and 33 within which a pair of substantially pure carbon sealing rings 34 and 35 are disposed. The carbon sealing rings are press-fitted within the annular sealing devices 30 and 31, that is, there is a press-fit between the outer peripheries of the carbon rings 34 and 35 and the inner facing cylindrical surfaces of the grooves 32 and 33 in the annular sealing devices 30 and 31. Therefore, there is a substantial minimum of fluid leakage possible betwen the carbon rings 34 and 35 and the sealing devices 30 and 31. The sealing devices 28 and 29 also comprise a pair of sleeve-like elements 36 and 37 which are formed of steel, preferably of the same type as the steel of which the annular members 30 and 31 are formed and which are provided with a clearance fit around sleeve shaft 12. The sleeve members 36 and 37 are respectively press-fitted into the members 30 and 31 and are each respectively bottomed against inwardly extending flanges 38 and 39. The two sleeve members 36 and 37 are each provided with a plurality of circumferentially spaced cup-like portions defining cup-shaped openings 40 and 41 adapted to respectively receive compression springs 42 which maintain substantially constant opposed biasing forces on the sleeve members 36 and 37 and in turn maintain substantially constant biasing forces on the carbon rings 34 and 35, tending to urge the latter into sealing engagement with the optically flat sealing surfaces 26 and 27.

Due to the clearance fit between the sleeve members 36 and 37 and the sleeve shaft 12, the carbon rings 34 and 35 are free to move angularly in order to accommodate any variations from true parallelism between surfaces 26 and 27 or in order to compensate for any tolerances or misalignment between the surfaces 26 and 27 which may occur during rotation thereof.

The housing 10 is formed with a seal drain 43 which communicates with the interior of the housing in the region of the sleeve members 36 and 37 and is made up of suitable annular members 44 and 45 which are secured to the housing proper by means of bolts 46 and 47. Obviously, the portion of the housing comprising the members 44 and 45 facilitates assembly of the sealing mechanism as will become apparent from the further following description. Disposed between the annular members 44 and 45 is an annular member 48 which is formed with a shoulder 49 adapted to abut a shoulder 50 on the housing proper and when the member 44 is retained in position by means of bolts 46, this holds the member 48 fixed relative to the other housing members.

The housing 10 also comprises a pair of annular rings 51 and 52 which together form a pocket for receiving the cup-like portions 40 and 41 of sleeves 36 and 37 and the axially opposed sides 53 and 54 of which form a pair of shoulder means. The annular members 30 and 31 also are formed with a pair of axially facing shoulders 55 and 56 which overlap radially and which are slightly axially spaced from the shoulder means 53 and 54 respectively.

A pair of diaphragms or membranes 57 and 58, preferably formed of nylon coated with rubber, respectively sealingly interconnect the housing 10 with the sealing devices 28 and 29. Thus, the sealing devices 28 and 29 are capable of slight axial movement relative to the housing within the limits afforded by the axial dimensions between shoulders 53 and 55 and shoulders 54 and 56.

The slight axial movement or play of the sleeves 36 and 37 and the parts secured thereto is further permitted by means of a tooth and slot interconnection between the housing 10 and the sleeves 36 and 37. This tooth and slot interconnection comprises two or more teeth 59 (only one of which is shown in the drawing) formed on the inner periphery of housing 48 and which teeth project into radially outwardly directed slots 60 and 61 respectively formed on sleeve members 36 and 37.

The annular members 30 and 31 are formed with radially inwardly opening annular grooves 62 and 63 and when the sleeve members 36 and 37 are respectively press-fitted into annular members 30 and 31, with the diaphragms 57 and 58 in place the entire portion of the diaphragms within the grooves 62 and 63 is placed under compression so as to afford a substantial seal between the members 30 and 31 and the sleeves 36 and 37. Similarly, when the housing members 45 and 44 are bolted to the main housing member by means of bolts 46 and 47, that portion of the diaphragms 57 and 58 disposed adjacent the members 45 and 44 is placed under compression so as to provide a substantial seal between the diaphragms and the housing.

In the operation of the sealing assembly disclosed herein, the area or space designated by reference numeral 64 is filled with fuel and is maintained under some pressure of the order of 165–250 p.s.i. (for example) whereas the area or space around the bearings 14 and more particularly the area designated by reference numeral 65, is filled with some lubricating oil which is under a substantially lesser pressure of the order of atmospheric pressure or possibly less. The diaphragms 57 and 58 prevent or tend to prevent direct fluid communication between areas 64 and 65 and the seal drain 43; however, inasmuch as the tooth and slot connection between the sealing devices 28 and 29 and the housing 10 prevent any substantial relative movement between the sealing devices of the housing, the problem of sealing against direct fluid communication from areas 64 and 65 to seal drain 43 is not as difficult as is the case in sealing against fluid communication from areas 64 and 65 to seal drain 43 by way of the space between sleeves 36 and 37 and sleeve shaft 12. By providing the lost motion interconnection between the sealing sleeves 36 and 37 and the housing 10 which enables the sealing devices 28 and 29 to move and stay in substantial sealing contact with members 17 and 22, the present invention affords an improved sealing structure over that which is conventional.

In practice, it is not too difficult to maintain accurate dimensions between surfaces 27 and 26, however, it is somewhat more difficult to maintain accuracy in the relative axial or angular position of the shaft assembly 12 and 13 within housing 10. By the use of the present sealing structure, slight inaccuracies in the disposition of the shaft assembly 12 and 13 within the housing 10 or in the angular disposition of the shaft assembly within the housing 10 is not a great problem as the sealing devices 28 and 29 are movable relative to both the housing 10 and the shaft assembly 12 and 13 and thereby are capable of compensating for this possible misalignment of the shaft assembly 12 and 13 within the housing 10. Actually, such misalignment can be quite extreme and up to the limits afforded by the sleeves between the overlapping shoulders 53 and 55 and shoulders 54 and 56. As long as the dimensions between the peripheral surfaces 27 and 26 are substantially constant, the compression springs 42 maintain a substantially constant force of engagement between the carbon rings 34 and 35 and surfaces 26 and 27.

The lost motion connections afforded by the teeth 60 and 61 and the slots 59, in addition to permitting axial and oscillatory motion of the sealing members 34, 30, and 36 and sealing members 35, 31 and 37 by means of the flexibility of the diaphragm members 57 and 58 respectively, also protects members 57 and 58 from tangential stress loads caused by frictional drag arising from the relative motion of the rotating sealing surfaces 26 and 27 with the carbon sealing rings 34 and 35. The lost motion connections also prevent tangential frictional forces from rotating the sealing members relative to the housing. This feature prevents twisting of the outer peripheral portions thereof, and thereby prevents separation of the carbon rings 34 and 35 from the rotating seal faces 26 and 27.

From the foregoing detailed description of the present invention it will become apparent that numerous changes and modifications may be made therein without departing from the spirit or scope thereof.

What is claimed is:

1. A seal assembly comprising in combination means defining a substantially hollow housing adapted to receive a rotatable device therein, said rotatable device being formed with axially spaced substantially parallel radially outwardly extending surfaces, a pair of axially movable annular sealing devices respectively formed with substantially optically flat sealing surfaces and adapted to engage said radially outwardly extending surfaces for providing a seal therebetween, said axially movable annular sealing devices being interconnected with said housing by lost motion connection permitting free axial movement of said sealing devices relative to said housing and permitting rotary motion of said sealing devices relative to said housing, a plurality of resilient biasing means operatively disposed between said annular sealing devices and adapted to exert a substantially constant biasing force on said sealing devices to urge said sealing devices into engagement with said radially outwardly extending surfaces, diaphragm means respectively connected to said housing and to said axially movable annular sealing devices for enabling axial displacement of said axially movable annular sealing devices to accommodate variations in the position of said rotatable device within said housing while simultaneously permitting said resilient biasing means to maintain substantially constant force on said sealing devices, said diaphragm means and said axially movable annular sealing devices forming a substantially fluid-tight seal defining a low pressure zone within said housing, and shoulders connected to said housing respectively preventing flexing of said diaphragm means.

2. A seal assembly in accordance with claim 1 wherein each of said axially movable annular sealing devices are formed with tooth means and the housing is formed with slot means with which said tooth means cooperate to thereby provide said lost-motion connection.

3. A seal assembly in accordance with claim 1 wherein said housing and each of said axially movable annular sealing devices are respectively formed with radially overlapping and axially spaced shoulder means between which said diaphragm means are respectively axially movable in order to facilitate the axial movement of said movable annular sealing devices relative to said housing.

References Cited in the file of this patent

UNITED STATES PATENTS

| | | |
|---|---|---|
| 2,215,034 | Gorman | Sept. 17, 1940 |
| 2,497,704 | Voytech | Feb. 14, 1950 |
| 2,628,852 | Voytech | Feb. 17, 1953 |
| 2,749,156 | Cliborn | June 5, 1956 |
| 2,824,760 | Gits | Feb. 25, 1958 |
| 2,859,988 | Payne | Nov. 11, 1958 |
| 2,882,075 | Biering | Apr. 14, 1959 |